United States Patent Office 3,684,580
Patented Aug. 15, 1972

3,684,580
BATTERY SEPARATOR MATERIALS
Michael J. Lysaght, 3 Arizona Terrace, Arlington, Mass. 02174, and Robert W. Hausslein, 21 Prospect Hill Road, Lexington, Mass. 02173
No Drawing. Continuation-in-part of application Ser. No. 732,896, May 29, 1968. This application Aug. 19, 1970, Ser. No. 65,306
Int. Cl. H01m 3/02
U.S. Cl. 136—146                                        14 Claims

ABSTRACT OF THE DISCLOSURE

A bibulous polymeric material suitable for use in making separators for silver-zinc batteries, the material being characterized by a very low average pore diameter, advantageously below 300 angstroms, and by a high volume porosity, advantageously above 50%. This material is primarily a copolymer of methacrylic acid and a hydrophobic monomer e.g. styrene or of methacrylic acid and a cross-linking monomer, most advantageously divinyl benzene: an especially advantageous process for making such materials is also disclosed and claimed.

---

This application is a continuation in part of copending application Ser. No. 732,896 now abandoned, filed May 29, 1968.

This invention relates to bibulous polymeric material adapted for use as a separator in batteries and fuel cells, and as a means of positioning and supplying liquid electrolyte or etching agent in electrochemical processing or etching, as well as to separators and etching members made therefrom.

BACKGROUND OF THE INVENTION

There is a need for improved bibulous materials for use as battery separators in the corrosive environment of batteries such as lead-sulfuric acid batteries or AgO-Zn batteries wherein KOH is the electrolyte and for use in other severe environments. Among such other environments are fuel cells utilizing KOH as an electrolyte and other applications wherein it is convenient to imbibe KOH or oxidizing agents into a chemically-resistant material as in electrochemical processing or etching procedures in which it is desired to control the location of a liquid electrolyte or etchant such as sulfuric acid in or to bring it into contact with a selected portion only of the surface of a material to be electrolyzed or etched. The bibulous material used in such procedures must be capable of holding or storing a supply of corrosive electrolyte over a long period of time without permitting it to be lost by flowing away, must be capable of being shaped, e.g. by cutting, to the desired configuration and of holding its configuration under the usual operating conditions, and must be capable of releasing the stored electrolyte at the desired time and location. A considerable amount of effort has been expended in attempting to develop such materials. Nevertheless, up until the present invention, no material has been developed which equals or exceeds the performance characteristics of cellophane in AgO-Zn batteries.

One attempt to develop a new material involved the cross-linking of low density polyethylene film with divinylbenzene and subsequent grafting thereon of acrylic acid. Both the cross-linking and grafting reactions were initiated by radiation from a cobalt-60 source. Another attempt to form a suitable material was made using microporous polyethylene membranes impregnated with poly (methacrylic acid) which had been cross-linked with divinylbenzene. The resistivity of this latter membrane was 50 ohm-centimeters. Thus, although the material will be seen to be close in chemical composition to some of the materials of the instant invention disclosed below, it will be manifest that the physical form of this prior art material was not that of the instant invention because the resistivity of the prior art separators were an order of magnitude above those formed according to the instant invention.

Thus, there has remained the problem, in the art relating to electrochemical devices such as batteries and fuel cells, of providing a material of suitable characteristics which mateiral has high electrical conductivity, yet low hydraulic porosity. The most versatile of any such material will also be characterized by excellent resistance to loss of structural integrity by chemical degradation when in contact with alkaline agents, be similarly resistant to the oxidizing gases encountered in so many electrochemical devices, and to oxidation by AgO, and be formable into such uniformly-structured articles as to prevent existence or formation of relatively high-conductivity paths therethrough which would, in some applications, provide paths for leading crystal growth.

SUMMARY OF THE INVENTION

Therefore, it is a principal object of the invention to provide a bibulous material that has improved performance characteristics in corrosive environments having very low resistivity (i.e. high conductivity) characteristics.

It is another object of the invention to provide improved separators for use in silver-zinc batteries, fuel cells and other such electrochemical devices.

A further object of the invention is to provide an improved process for making such a material.

Other objects of the invention will be obvious to those skilled in the art on reading the instant application.

It has now been discovered by applicants that when a composition, having the required resistance to chemical attack and dimensional stability, is formed into structures of carefully-controlled pore size and volume porosity, the resultant material will be excellent for battery separator applications and other such uses which require high performance in contact with chemicals of a highly corrosive nature. This discovery has made possible the construction of improved battery separators and, consequently, improved battery devices. The volume porosity or void space and the pore size of the new materials have been discovered to be criteria of prime importance in assuring the suitability of the bibulous polymeric material for its intended uses. The volume porosity should be at least 50 volume percent and the pore diameter should be less than about 300 angstroms and, preferably, within the range from 20 to 150 angstroms.

Moreover, applicants have discovered particular classes of polymeric materials which are especially well adapted for use in forming the material of the invention.

It has also been discovered that improved pore-size distribution is obtained when the process of forming the materials of the invention includes the steps of forming a prepolymer and subjecting the prepolymer to curing (or crosslinking) in a closed mold.

Pore size of the pores within the material of the invention has been determined by means of the Electrolyte Permeability method set forth in Chapter 5b of Characteristics of Separators for Alkaline Silver Oxide Zinc Secondary Batteries, edited by J. E. Cooper and Arthur Fleischer and published by the Air Force Aero Propulsion Laboratories of the United States Air Force. It has been determined that the material of the invention must have a maximum pore diameter of 300 angstroms and preferably a diameter within the range from 20 angstroms to 150 angstroms.

Porosity, i.e. percent of total volume taken up by pores, has been determined by the method set forth in Chapter 5a of the aforesaid Air Force publication. The porosity was determined using 40% aqueous KOH as the imbibed liquid. To provide suitable materials according to the invention the porosity should be at least 50 volume percent, but preferably in the range of 65 to 80 volume percent. Above 90 percent, the film is usually too weak with respect to its mechanical properties to act as a suitable separator material. Below 50 percent, the resistivity of the film is undesirably high and the volume of electrolyte available is too low for effective electrochemical processing or etching.

The polymeric material employed in the present invention consists of copolymers of methacrylic acid (or of mixtures of methacrylic with a minor proportion, up to 20% by weight of the mixture, of another hydrophilic monomer containing a single polymerizable unsaturation) with a copolymerizable hydrophobic monomer containing a single polymerizable unsaturation, such as styrene, diphenyl acetylene allyl fluoride, 2,3-dimethyl butene-2, 1,1-difluoroethylene, 3-chloro-2-methyl propene, 1,2-difluorostyrene, meta-fluorostyrene, vinyl toluene, vinyl butyl sulfide, and the like. Among the other hydrophilic monomers which may be present along with the methacrylic acid, in an amount preferably no more than 15% by weight, based on the total weight of hydrophilic monomers, are acrylic, maleic, fumaric, itaconic, and cinnamic acids. The inclusion of these other hydrophilic monomers usually decreases the extent of the pH range throughout which the polymeric material is stable, so that they will be included usually only in particular situations where they provide a specific advantage (such as greater physical strength) of more importance than the decrease in stability.

The ratio of methacrylic acid (or of a mixture of methacrylic acid with another hydrophilic monomer) to hydrophobic monomer ranges from 3:1 to 1.5:1 by weight, and is preferably about 2:1 by weight.

There may also be employed in the present invention copolymers of methacrylic acid (or of mixtures of methacrylic acid with other hydrophilic monomers as set forth above) with a polyunsaturated monomer, i.e., a monomer containing at least two polymerizable unsaturations, which acts as a cross-linking agent; among such cross-linking monomers are divinyl benzene, 1,3,5-triisopropenyl benzene, para-diisopropenyl benzene, divinyl sulfone, muconic acid, and other such compounds not containing ether, ester or other bonds vulnerable to basic or acidic attack; of these, divinyl benzene is preferred because of its ready availability, low cost, and high reactivity.

The ratio of methacrylic acid (or of mixtures of methacrylic acid with other hydrophilic monomers) to cross-linking monomer ranges from 125:1 to 8:1 by weight; in terms of molar ratios, this is defined as approximately 188:1 to 12:1 when divinyl benzene is the cross-linking monomer. When the polymeric material is to be utilized in a silver-zinc battery or to be exposed to other alkaline environments, the ratio is most advantageously from 15:1 to 8:1 (approximately 22:1 to 12:1 molar); and when it is to be used in a lead sulfuric acid battery or exposed to other acidic media, the most advantageous ratios are from 125:1 to 80:1 (approximately 188:1 to 120:1 molar).

Copolymers of methacrylic acid (or of mixtures of methacrylic acid with other hydrophilic monomers) with both hydrophobic monomers and cross-linking monomers may also be employed in the present invention, in which case the ratio of methacrylic acid (or of mixtures of methacrylic acid with other hydrophilic monomers) to the total hydrophobic and cross-linking monomers should be from 5:1 to 2.5:1 by weight, and the ratio of hydrophobic monomers to cross-linking monomers should be from 5:1 to 1.5:1 preferably 5:1 to 2:1 by weight. As a result of these limitations on the weight ratios, the minimum molar ratio of methacrylic acid to divinyl benzene is 11.6:1 when a hydrophobic monomer is also present.

When cross-linking monomers are employed, the polymeric material is flexible only when its pores are filled with a liquid such as water, aqueous electrolyte or other liquid electrolyte, glycerine, etc. when dried out, such polymeric material is hard and brittle.

When the above criteria relating to porosity and copolymer composition are met, the electrical resistivity of the material has been found to be surprisingly low, below 20 ohm-centimeters and usually less than 10 ohm-centimeters as determined by the alternating current method set forth in Chapter 6$b$ of the aforesaid United States Air Force publication. In fact, some of the more highly advantageous materials produced according to the invention have resistivities below 5 ohm-centimeters.

Divinyl benzene is normally supplied as a mixture of 55 wt. percent of divinyl benzene and 45 percent ethyl vinyl benzene. The presence of the ethyl vinyl benzene does not markedly affect the properties of the finished material as has been confirmed by several experiments with 95% pure divinyl benzene. Nevertheless, the ratios of reagents given above are on a pure divinyl benzene basis.

The polymerization of the monomers is suitably carried out with free-radical generating catalysts such as, for example, isopropyl percarbonate, benzoyl peroxide, isopropyl peroxide, t-butyl peroctoate, t-butyl peroxyisobutyrate, t-butyl peroxypivalate, and pelargonyl peroxide, of which isopropyl percarbonate is preferred. About one part of catalyst per 100 parts of methacrylic acid by weight is suitable, although catalyst levels can be varied over a wide range, from 0.1 to 5 parts by weight, as is known to those skilled in the art. Absence of chain terminating reactants like oxygen from the reaction zone is generally required. The polymerization can be accomplished at any convenient temperature. Elevated temperatures of from 50° C. to 90° C. are usually preferred because of the shorter times required for reaction.

The polymeric materials of the invention are advantageously formed in an inert organic solvent in which the monomers and catalyst are all dissolved. Materials so formed have improved porosity characteristics.

A solvent may be selected from the wide variety of inert organic media, i.e., which do not react chemically with the monomers or catalyst during polymerization, which are known to those skilled in the art to be suitable for the purpose. However, most advantageously, the solvent will be selected from organic solvents having Solubility Parameters between about 10 and 13 because use of such solvents has been found to result in materials being produced which have relatively small pore sizes. Among such solvents are N,N-dimethylformamide (henceforth sometimes referred to as DMF) dimethylsulfoxide, dioxane, ethyl alcohol, dimethylacetamide, and the like. When the polymeric material contains a cross-linking agent, it is preferred to use for polymerization a solvent which boils at a temperature about 20° C. or more above the temperature at which cross-linking takes place.

When the copolymer contains no cross-linking agent, polymerization can be carried out either with a solvent or in the absence of solvent, that is, with the monomers themselves acting as the only polymerization medium; when cross-linking agent is present, it is important that the polymerization system contain from 20 to 70 volume percent of inert organic solvent, preferably from 40 to 65 volume percent in order to attain the required physical strength in the product. For most satisfactory results, the tensile strength of the gel product should be at least 100 p.s.i. after equilibration by immersion in 40% aqueous potassium hydroxide solution at room temperature.

ILLUSTRATIVE EMBODIMENTS OF THE INVENTION

A solution was prepared containing the following components:

| | Grams |
|---|---|
| DMF | 29.4 |
| Methacrylic acid | 25.0 |
| Divinyl benzene (55% active) | 4.2 |
| Isopropyl percarbonate | 0.25 |

A mold was formed by clamping together two glass plates with a circular gasket, 4 inches in diameter and 0.008 inch thick, held therebetween. By using a syringe to penetrate the wall formed by the gasket, the mold was filled with the above-described solution. Thereupon the mold was placed in a 60° C. water bath for a first period of 24 hours during which a prepolymer formed and, then, an 80° C. water bath for a second period of 24 hours.

Next the mold was removed from the water bath, cooled, placed in a bath at about 25° C. and disassembled so that the material contained therein could be recovered and inspected. This material was found to be a flexible gel which was easily removed from the mold. This gel was equilibrated by immersion in water at about 25° C. and thereupon equilibrated by immersing in 40% aqueous KOH. In each case the gel, which appeared superficially to be dry on the outer surface, absorbed water or aqueous KOH in an amount to fill its porosity or void space. It would also absorb other aqueous alkalis such as sodium hydroxide.

The material thus equilibrated was exposed to a 2.0 molar aqueous oxidizing agent in the form of a $KMnO_4$ solution and also a solution of 0.2 molar $KMnO_4$ in 40% aqueous KOH solution. No deterioration of properties was detected. $KMnO_4$ was selected as a test medium because it has the same oxidation potential (0.60) as does silver peroxide, the corrosive element in a silver-zinc battery. Cellophane oxidized rapidly when exposed to a $KMnO_4$ solution of the same strength.

The following test data were obtained on the KOH equilibrated film:

| | | |
|---|---|---|
| Resistivity | ohm-centimeters | <2 |
| Tensile strength | p.s.i. | 80 |
| Porosity | percent | 78 |
| Pore size | angstroms | 20–40 |

A sample of the film was tested as a separator in a secondary silver-zinc battery cell having a nominal cell capacity of one amp-hour. The test cell consisted of two molded polymethyl methacrylate forms each generally 2.5 inches by 3 inches by ¼-inch thick. Each said form contains, on the inside surface thereof, a recess 0.040 inches deep and 1.75 by 2.25 inches. These cavities form the battery chamber when the forms are clamped together. The separator is held in place by being clamped between the two forms with a silver oxide plate on one side of the separator and a zinc plate on the other side. The plates are entirely within the battery chamber and are not held by the clamped forms. The nominal capacity of this test cell is one ampere-hour, based on the weight of the active cell material.

After the chamber is filled with an aqueous solution of 40% KOH, leads from each of the plates are connected across a variable resistor and discharged at exactly one amp until the cell potential drops below one volt. The external circuitry is then reversed and the cell is recharged at a rate not exceeding 0.2 amp. This charge-dicharge cycling is continued until the cell no longer can be recharged.

The cell was cycled four times according to the above procedure. Average power capacity of the four cycles was 1.5 watt-hours.

When cellophane is used in the same cell, average capacity is only 1.25 amp-hours, and cycle life varies from 4 to 6 cycles. The higher capacity of the batteries utilizing the material of the invention is due to its lower resistivity.

After four cycles, the separator prepared according to this working example was inspected. A small tear was detected in the bottom portion thereof, apparently caused by the sharp edges of the zinc electrode which tends to slump to the bottom of the test cell during the testing procedure. The cellophane separator, run as a control standard, did not have any such tear; its failure was caused by the penetration thereof of a dendrite crystal growth through the intact cellophane film.

Example 2

The procedure of Example 1 was followed but using a reaction mix formed from the following compounds:

| | |
|---|---|
| DMF | 28.8 |
| Methacrylic acid | 21.4 |
| Divinyl benzene (55% active) | 3.5 |
| Styrene monomer | 3.6 |
| Isopropyl percarbonate | 0.25 |

The resultant film was determined to have the following properties:

| | | |
|---|---|---|
| Porosity | percent | 67 |
| Resistivity | ohm-centimeters | 6 |
| Tensile strength | p.s.i. | 160 |

The small amount of styrene monomer contributed significantly to the mechanical strength of the film with a minimal increase in resistivity and a minimal decrease in porosity.

Example 3

A mixture was prepared of the following compounds:

| | Grams |
|---|---|
| Water | 25.5 |
| Methacrylic acid | 25.0 |
| Divinyl benzene (55% active) | 0.5 |
| Isopropyl percarbonate | 0.25 |

The mixture was heated to 40° C. for 30 minutes to dissolve the divinyl benzene.

After proceeding to complete the reaction at 80° C. as described in Example 1, a film was obtained which was equilibrated by immersion in 93% $H_2SO_4$, an aqueous oxidizing agent, at 0° C. for 24 hours. The film, on removal from the acid, was blotted dry (to the touch) and stored in a predried, sealed jar for 2 weeks at room temperature. After this period the surface of the film was still dry to the touch and there was no sign that liquid had synergized from the gel.

A portion of this "dry" material was leached out with water and a titration of the water revealed that the film had contained over 1.6 grams of $H_2SO_4$ per cubic centimeter of gel. A second portion of the film was equilibrated by immersion in 35% $H_2SO_4$ and the resultant material was found to have a resistivity of 4 to 5 ohm-centimeters. This gel was found to be effective for etching metallic plates by placing it in contact therewith; the etching was confined to the area in contact with the gel, which can be of any desired shape and size.

Still another portion of this gel was equilibrated by immersion in an aqueous 10% $H_3PO_4$ solution, an aqueous oxidizing agent. After being blotted dry, it remained dry and flexible. Its utility as a useful processing tool in electrochemical processing was demonstrated when it was used to contact tantalum elements on a printed circuit board, which elements were thereupon electrochemically oxidized to the desired tantalum oxide.

Still another portion of the gel was immersed in water at 20° C. immediately after completion of the polymerization reaction, without immersion in alkali or acid. The gel was then removed from the water, dried, and ground to a powder passing a 200 mesh screen. The powder, when immersed in concentrated sulfuric acid (93%) absorbed a large quantity of the acid; removal of excess acid left an apparently dry powder. When the powder was subsequently immersed in water, the particles contract simultaneously with leaching of acid therefrom producing very rapidly a 60% sulfuric acid solution. This characteristic makes the gel powder useful for storing liquid electrolytes such as sulfuric acid in dry solid form while at the same time making them repidly available simply by adding water to the powder. Such a powder can be used in lead-sulfuric acid storage batteries, making it possible to activate them simply by adding water.

In each case the gel was capable of absorbing aqueous oxidizing agent in an amount sufficient to fill the porosity or void space in the gel, i.e., from 50 to 90 volume percent.

Example 4

The procedure of Example 1 was repeated except that gamma-butyrolactone was used as the solvent. The resulting film had substantially the same resistivity and porosity as the film of Example 1 but the average pore size was in excess of 1000 A. The most salient difference between the solvents DMF and gamma butyrolactone with respect to the polymeric material of the invention is that the former has a solubility parameter of about 12.1, the latter a solubility parameter of about 15.5.

Although the battery separator illustrated was used in a silver-zinc secondary battery, such separators are also useful in primary batteries and other electrochemical devices.

Example 5

A mixture was prepared containing the following components:

Methacrylic acid
Styrene
Isopropyl peroxide

The mixture was polymerized in a mold as described in Example 1 except that there was used a temperature of 30° C. for 48 hours, then removed from the mold in the form of a gel film which was equilibrated by immersion in water. Upon subsequent immersion in 40% aqueous KOH, the gel film swelled but did not dissolve. The swollen film was found to have a resistivity of 4 ohm-centimeters, a tensile strength of 400 p.s.i. and satisfactory flexibility, stability, pore size, and porosity.

The gel resulting from polymerization could be dissolved in DMF to form a solution containing 20% by weight which could be employed to form a film of any desired shape and thickness by casting and removing the solvent either by evaporation or by immersion in water. Films prepared by this procedure possessed essentially the same properties upon immersion in 40% aqueous KOH as described above.

Because of its thermoplasticity, the copolymer could also be extruded in any desired shape, and extruded films also possessed the desired properties.

What is claimed is:

1. A bibulous polymeric material suitable for use as a battery separator in acid or alkaline batteries and for storage of liquid electrolytes in solid form, said material comprising a copolymer of (1) methacrylic acid, or of a mixture of methacrylic acid containing up to 20% by weight of another hydrophilic monomer containing a single polymerizable unsaturation, with (2) a cross-linking monomer containing at least two polymerizable unsaturations or with (3) a hydrophobic monomer containing a single polymerizable unsaturation or with (4) a mixture of both said cross-linking monomer and said hydrophobic monomer, the ratio of (1) to (2) being from 125:1 to 8:1 by weight and the ratio of (1 to (3) being from 3:1 to 1.5:1 by weight, and the ratio of (1) to (4) being from 5:1 to 2.5:1 and the ratio of hydrophobic to cross-linking monomer in (4) being from 5:1 to 1.5:1 by weight, said polymeric material having a porosity above 50%, a pore diameter less than 300 angstroms, and a volume resistivity less than 20 ohm-cm.

2. A bibulous polymeric material as claimed in claim 1 in which the ratio of (1) to (2) is from 15:1 to 8:1 by weight.

3. A bibulous polymeric material as claimed in claim 1 in which the ratio of (1) to (2) is from 125:1 to 80:1 by weight.

4. A bibulous polymeric material as claimed in claim 1 in which said material comprises a copolymer of methacrylic acid with divinyl benzene in a ratio of 125:1 to 8:1 by weight.

5. A bibulous polymeric material as claimed in claim 1 in which said material comprises a copolymer of methacrylic acid with styrene in a ratio of 3:1 to 1.5:1 by weight.

6. A bibulous polymeric material as claimed in claim 1 in which said material comprises a copolymer of (1) methacrylic acid with (2) divinyl benzene and with (3) styrene, the weight ratio of (1) to the sum of (2) and (3) being from 5:1 to 2.5:1, and the weight ratio of styrene to divinyl benzene being 5:1 to 1.5:1.

7. A battery separator formed of the material defined in claim 1.

8. An improved battery comprising, between positive and negative plates thereof, a separator formed of the material defined in claim 1.

9. The process of forming a bibulous material suitable for use in battery separators comprising the steps of polymerizing (1) methacrylic acid, or of a mixture of methacrylic acid containing up to 20% by weight of another hydrophilic monomer containing a single polymerizable unsaturation, with (2) a cross-linking monomer containing at least two polymerizable unsaturations or with (3) a hydrophobic monomer containing a single polymerizable unsaturation or with (4) a mixture of both said cross-linking monomer and said hydrophobic monomer, the ratio of (1) to (2) being from 125:1 to 8:1 by weight and the ratio of (1) to (3) being from 3:1 to 1.5:1 by weight, and the ratio of (1) to (4) being from 5:1 to 2.5:1 and the ratio of hydrophobic to cross-linking monomer in (4) being from 5:1 to 1.5:1 by weight, in a reaction mix comprising, when cross-linking monomer is present, from 20 to 70% by volume of inert organic liquid solvent, said polymerizing taking place within a closed mold, and removing said organic solvent from the resultant polymer mass.

10. The process of claim 9 wherein said solvent has a Solubility Parameter between about 10 and 13.

11. The process of claim 9 wherein said solvent has a boiling point at least about 20° C. above the temperature at which said polymerization is accomplished.

12. The process as claimed in claim 9 including the additional step of immersing the polymer mass in an aqueous solution of an oxidizing agent or alkali to absorb the same.

13. As an article of manufacture, the bibulous material of claim 1 comprising an aqueous oxidizing agent incorporated therein.

14. The article of claim 13 wherein said oxidizing agent is phosphoric acid, potassium permanganate or sulfuric acid.

References Cited

UNITED STATES PATENTS

| 2,731,408 | 1/1956 | Clarke | 260—88.1 PC |
| 3,297,595 | 1/1967 | Mindick et al. | 136—146 |
| 2,747,009 | 5/1956 | Kirkwood et al. | 136—146 |
| 2,978,402 | 4/1961 | Hoch et al. | 204—296 |

DONALD L. WALTON, Primary Examiner

U.S. Cl. X.R.

136—148; 260—88.1 PC

UNITED STATES PATENT OFFICE
CERTIFICATE OF CORRECTION

Patent No. 3,684,580          Dated August 15, 1972

Inventor(s) Michael J. Lysaght and Robert W. Hausslein

It is certified that error appears in the above-identified patent and that said Letters Patent are hereby corrected as shown below:

In the headnote, following the names of the inventors, insert the following:

--assignors to Amicon Corporation, a corporation of Massachusetts--.

Signed and sealed this 3rd day of April 1973.

(SEAL)
Attest:

EDWARD M. FLETCHER, JR.          ROBERT GOTTSCHALK
Attesting Officer          Commissioner of Patents